United States Patent Office 3,380,952
Patented Apr. 30, 1968

3,380,952
COMPOSITION FOR IMPARTING TACK TO
α-OLEFIN-BASED ELASTOMERS
Edward F. Cluff, Alexander Thomas Harris, and Kenneth
Francis King, Wilmington, Del., assignors to E. I. du
Pont de Nemours and Company, Wilmington, Del., a
corporation of Delaware
No Drawing. Filed Jan. 18, 1966, Ser. No. 521,411
8 Claims. (Cl. 260—33.8)

ABSTRACT OF THE DISCLOSURE

The overdip composition herein described imparts controlled bonding tack to saturated-backbone, sulfur-curable elastomer copolymers of α-olefins suitable for building-up nylon ply tire carcasses on automotive equiment.

---

It is known that saturated-backbone, sulfur curable elastomeric coplymers of α-olefins such as the EPT elastomers can be used to make excellent tires for automobiles and the like. A serious difficulty, which has been widely recognized, is that the EPT and like elastomers are deficient in building tack. Building tack is the property of two uncured elastomeric surfaces to cohere when contacted.

It has also been known that overdips can be employed to increase the building tack of saturated-backbone, sulfur-curable, elastomeric copolymers. Such overdips have proved useful for the manufacture of tires on non-automatic equiment. When, however, attempts have been made to employ, for example, overdip treated EPT elastomers on automatic equipment, it has in some cases not proved possible to manufacture tire carcasses successfully even though the treated EPT elastomers had excellent building tack. Particularly great difficulty is experienced with stiff plies, such as are obtained when nylon tire cords are employed.

In the automatic tire building equipment now coming into widespread commercial use, the tire is built on a collapsible drum. The operator first puts down a liner which is typically a chlorinated butyl rubber or a mixture of SBR and natural rubber. Next the desired number of plies of rubberized tire cords are wrapped around the liner. These plies extend beyond each end of the drum. The automatic equipment then draws down the overlapping ends of the plies, and inserts over each end the rubberized tire beads. The ends of the plies are then wrapped over the beads by finger-like turn up rollers which are inserted into the drum beneath the plies and pivoted to roll the plies back over the bead. The drum rotates at about 220 r.p.m. during this operation, which is completed in about 10 to 15 seconds.

It has now been found that tack, as conventionally measured on laboratory equipment, does not adequately define the nature of the required elastomer properties. Several factors appear to be important.

(1) For use with nylon cord plies the tack should have a relatively low value initially and either remain constant with rapid repeated adhesions and separations, or increase slightly for at least about 30 adhesions and separations.

(2) The peel strength of the adhered surfaces should increase with time i.e. the surfaces should weld.

(3) The adhered surfaces should form a cured bond substantially equal in strength to that of the cured base elastomeric materials joined by tacking.

The necessity for the relatively low value of the initial tack and the repeat tack performance, when nylon tire cords are employed is believed to be related to the cyclical nature of the turn up process in the automatic tire building equipment. Less stringent requirements apply when rayon or polyester tire cord fabrics are used instead of nylon.

The present invention provides an overdip solution which can be applied to saturated-chain, sulfur-curable, elastomeric α-olefin copolymers to give building tack performance meeting the above-listed requirements, and a method for adhering articles made from said saturated chain, sulfur-curable elastomeric copolymers of α-olefins.

The tackifying overdip compositions of this invention comprise:

(I) a linear statistical sulfur-curable chain saturated elastomeric copolymer of (a) from 30 to 45 weight percent of units having the formula:

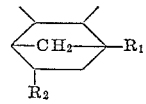

said units being derived from a norbornene having the formula:

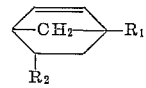

wherein $R_1$ and $R_2$ are hydrogen or alkyl groups having from 1 to 4 carbon atoms.

(b) from 2 to 15% by weight of unsaturated units derived from a non-conjugated aliphatic diene having at least one double bond polymerizable with an anionic catalyst, and (c) the balance of said copolymers being units derived from a straight chain α-olefin having from 2 to 4 carbon atoms and optionally minor amounts of other polymerizable α-olefins having from 5 to 18 carbon atoms, said copolymers having a solution viscosity (measured on an 0.1% by weight solution in tetrachloroethylene at 30° C.) of from 0.5 to 2.0.

(II) A low molecular weight cyclic polymer of isoprene having an unsaturation of about 0.1 to about 1.5 moles/kg., as measured by bromine addition, in an amount of from 0.1 to 5 parts per part by weight of said copolymer.

(III) About 0.5 to about 1.5 parts of carbon black per part of said copolymer; the ingredients I to III inclusive being dissolved or dispersed to form a mixture containing from about 5 to about 50% by weight of total solids in (IV) a weak or non hydrogen-bonding solvent having a solubility parameter between about 7.3 and about 9.5 at 25° C.

In use, the above overdip solution is applied to each of the surfaces of the saturated-chain sulfur-curable elastomeric copolymers to be bonded, and dried. The overdipped elastomeric surfaces can then be adhered by pressing together, and on curing will produce an article having excellent joint strength.

The copolymers employed in the overdip solution of the present invention include norbornenes having the formula:

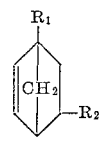

wherein $R_1$ and $R_2$ are independently either hydrogen or an alkyl radical having from 1 to 4 carbon atoms. These materials are known compounds and can be made by the Diels-Alder reaction of cyclopentadiene or a substituted cyclopentadiene and an α-olefin. The preferred species is norbornene having the formula:

i.e. where $R_1$ and $R_2$ are each hydrogen, which can be made by the reaction of ethylene with cyclopentadiene.

The concentration of norbornene in the copolymer is critical if excellent tack properties are to be obtained. The optimum concentration is about 40% by weight, but excellent building tack can be obtained with concentrations of the norbornene between about 30% and about 45% by weight of the copolymer.

The cure site monomer is also an essential ingredient of the overdip copolymer. One class of cure-site monomers is non-conjugated aliphatic dienes having from 6 to 22 carbon atoms and at least one terminal double bond. Suitable compounds can be represented by the formula:

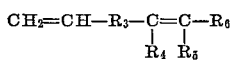

wherein $R_3$ is an alkylene radical and $R_4$, $R_5$, and $R_6$ are alkyl radicals. The preferred species is 1,4-hexadiene. Other cure-site monomers that can be employed include cyclic aliphatic non-conjugated dienes such as dicyclopentadiene, 5-methylene-2-norbornene, 5-alkenyl-2-norbornenes, 2-alkyl-2,5-norbornadienes and cyclooctadiene. The term aliphatic is intended to include such cyclic aliphatic or alicyclic compounds.

The α-olefin employed in the elastomeric copolymer component of the overdip solution is preferably ethylene. Propylene or butene can also be employed. Minor amounts of the olefins having 2 to 4 carbons can be replaced with other α-olefins preferably linear aliphatic α-olefins having from 5 to 18 carbon atoms.

The concentration of the cure-site monomer and its nature are not highly critical; however in general these factors will be selected to give a curing rate for the particular curing system to be employed which is about the same as the compounded substrate elastomeric copolymers which are to be tacked together and subsequently cured. Generally the unsaturation level in the copolymer component of the overdip composition should be at least 0.1 gram moles/kilogram of copolymer. The usual range of diene content is sufficient to provide from about 2 to about 15 weight percent of unsaturated units in the copolymer.

The copolymer employed can be made by contacting the monomers, in suitable proportions with certain coordination catalysts, preferably soluble coordination catalysts based on (1) vanadium compounds such as vanadium tetrachloride, vanadium oxytrichloride, vanadium tris (acetylacetonate), vanadium oxybis(acetylacetonate), trialkyl orthovanadates such as triethyl orthovanadate, triisobutyl orthovanadate, and tris(p-chlorophenyl) orthovanadate and (2) an organo metallic reducing agent, particularly organoaluminum compounds of which the dialkyl aluminum chlorides such as diisobutyl aluminum chloride, are preferred.

The catalytic polymerization is preferably conducted in a solvent such as cyclohexane or tetrachloroethylene. At least one of the catalyst components should contain halogen unless the reaction medium itself is a halogenated compound.

Coordination catalysts based on titanium compounds can also be employed but have a tendency to rearrange the norbornene components to produce units in the polymer having the formula:

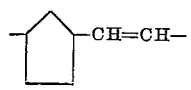

rather than units having the formula:

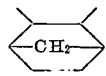

Since the rearranged units have unsaturation in the principal chain of the polymer, which facilitates oxidative and other degradation of the polymer chain it is highly desirable that rearrangement should be avoided.

The copolymers employed are essentially linear i.e. the monomer units are incorporated in the polymer chain as bivalent units, and there is no branching of the principal chain other than that found in the unpolymerized monomer units. They are saturated in the principal chain so that the rupture of any double bond causes no substantial decrease in molecular weight. The copolymers can also be described as statistical copolymers, that is copolymers made by employing a reaction medium containing at all times all of the monomer species which are to be incorporated in the copolymers. In contrast block copolymers or graft copolymers (according to present technology) are made by reacting only one or part of the various monomer species at any one time.

The distribution of the various monomer units in the copolymer is not known precisely but it is believed that the norbornene units tend to be isolated from each other by at least one other monomer unit.

The molecular weight of the copolymers is also critical and the inherent viscosity, as measured on an 0.1% solution in tetrachloroethylene at 30° C. should be from 0.5 to 2.0. The molecular weight can be controlled during the polymerization process by the presence of small amount of hydrogen gas in the polymerizaztion vessel, which acts as a telomerizing agent.

The function of the copolymer ingredient of the overdip is to provide tack, and also to provide strength to the bonded elastomeric articles which tends to "weld" with time.

The low molecular weight cyclic polymer of isoprene which forms the second essential ingredient of the composition has a structure similar to that of cyclized rubber, as indicated by its infrared spectrum, a number average molecular weight measured by the cryoscopic method, with benzene as solvent of about 700 to about 3000, and has an unsaturation level of about 0.1 to 1.5 moles/kg. The cyclic structure is indicated by the low degree of unsaturation. Suitable material can be obtained as a byproduct in the commercial manufacture of isoprene.

The function of the cyclic polymer of isoprene is to modify the tack properties of the overdip compositions, in imparting tack to chain-saturated sulfur-curable elastomeric copolymers of α-olefins, more particularly the repeat tack properties. Repeat tack can be defined as the force per unit area required to separate two elastomeric articles after a specified number of contacts and separations at a specified pressure and for a specified time. In the manufacture of automotive tire carcasses on automatic equipment, the nature of the repeat tack properties is a good index of whether the critical operation of automatically turning up the ply ends over the beads can be successfully accomplished. This is most probably due to the cyclical nature of the process.

Rayon tire cords are relatively flexible, and in general a greater degree of "quick grab," i.e. high initial values of the tack, can be tolerated with rayon cord plies than with comparable nylon cord plies. Nevertheless minor amounts of the cyclic isoprene polymer additives are beneficial in the manufacture of tires with rayon cords in order to decrease the "quick grab." In general, compositions for the manufacture of carcasses from rayon tire cord plies should contain at least 0.1 and preferably 0.2 part of the cyclic isoprene polymer additive per part of copolymer by weight in the overdip.

With tire plies containing nylon cord, the criterion for making successful turnups of the plies about the bead on automatic equipment is that the tack, under constant conditions should either remain constant or increase with the number of repetitions up to at least about 30 repetitions. This result is achieved with compositions containing at least about 0.75 part of resin per part of copolymer by weight in the overdip.

The upper limit to the amount of the cyclic polymer of isoprene which may be added to the overdip composition is determined by the degree of stickiness, i.e. adhesion towards materials other than itself which can be tolerated, and by the necessity for the bond formed between the elastomeric articles to resist forces encountered in the processing, and before cure. Increasing amounts of the cyclic polymer of isoprene increase stickiness and decrease the "welding" of the formed bonds with time. In general not more than about 5 parts of the cyclic polymer of isoprene should be employed per part of the copolymer component of the overdip. Preferably not more than about 2 parts of the cyclic polymer of isoprene per part of the elastomeric copolymer should be employed.

The effect of the cyclic polymer of isoprene is to decrease the initial tack, i.e. tack after 1 to about 3 repetitions of making and breaking the joint. However after about 30 repeated contacts and separations the cyclic polymer of isoprene increases the tack value to a value greater than that obtained in its absence.

Another important function of the cyclic polymer of isoprene additive is that the tacky property is maintained for a longer period after coating the substrate than is the case with the unmodified norbornene-based copolymers.

The third essential component is carbon black of which furnace blacks are preferred. The function of the carbon black is to form a suitably strong vulcanized joint. The minimum amount of carbon black which should be employed is about 0.5 part per part of the copolymer. The exact minimum for adequate reinforcement depends on the nature of the black and on the nature of the copolymer. The preferred upper limit is about 1.5 parts of carbon black per part of copolymer in the overdip solution. The amount of carbon black is not highly critical. The amount required for optimum performance depends on a variety of factors. In general, amounts of carbon black should be increased when the copolymer component of the overdip has a low molecular weight or when the amount of the cyclic isoprene polymer is increased.

Other ingredients such as curing agents, antioxidants, processing oils and the like which are conventionally employed in rubber technology can also be added to the overdip composition. These agents are not, however, essential in view of the relatively minor amount of the overdip which is employed to coat the elastomeric substrate, since they will in any case migrate between the coating and the compounded substrate.

The ingredients of the overdip compositions are dissolved or dispersed in a suitable organic solvent for the copolymer component to give a mixture preferably having a total solids concentration between 5 and 50 percent by weight, although this is in no way critical. The solvent should preferably have a solubility parameter, as defined by Hildebrand and Scott, "The Solubility of Non-Electrolytes," American Chemical Society Monograph Series, Reinhold Publishing Co., New York, N.Y., 3rd edition, 1950, of about 7.3 to about 9.5. The solvent should be of the weak or non-hydrogen bonding type and preferably, though not essentially, should be relatively volatile.

The backbone-saturated sulfur-curable elastomeric hydrocarbon polymers which are employed as the substrate polymers are copolymers of an α-olefin, preferably ethylene, with at least one other α-olefin, preferably propylene, and a cure-site monomer. The cure-site monomers and the method of making elastomeric α-olefin copolymers which can be employed are the same as described hereinabove for the elastomeric norbornene copolymers employed in the overdip formulation. Preferred elastomeric sulfur curable saturated-chain hydrocarbon polymers are ethylene/propylene/1:4-hexadiene copolymers; however the overdip composition of the present invention can be used to provide building tack to many other similar elastomers.

The substrate copolymer is compounded in the usual way with conventional curing agents, generally the sulfur-curing systems or the resin curing systems. The substrate elastomer may be used to coat and to bind tire cords into plies to coat beads or the like to form the conventional components employed in the building of tires.

The prefabricated article having a surface of the substrate elastomeric hydrocarbon copolymer, is then coated with the overdip solution by methods familiar to those skilled in the adhesives art such as by brushing, rolling, spraying, swabbing, dipping, knife coating and the like. The thickness of the coating should be sufficient to deposit at least about 10 mg. of solids/sq. in. Coatings of about 20 to about 35 mg./square inch are preferred, however the exact amount of coating is not critical. The liquid solvent or carrier is then removed by evaporation or by permitting permeation into the elastomeric copolymer substrate.

Each of the surfaces to be adhered is coated with the overdip formulation. Coating only one surface is not effective. The finished articles are then ready to be fabricated into automotive tires and the like on conventional equipment. If the coated articles are not to be used immediately it is preferable that the coated surfaces be protected from dust, lint and the like by a suitable removable coating such as embossed polyethylene.

Solvent wiping can be employed, as in the conventional manufacture of tires, to increase the initial tack or "quick grab" when this is desirable.

The overdip formulations of this invention can be used to impart tack to saturated-chain sulfur-curable elastomeric copolymers of α-olefins such as the EPT elastomers. In particular this invention provides overdip compositions suitable for the fabrication of tire carcasses on automatic equipment using plies having nylon, rayon, or polyester tire cords. Radial ply tire carcasses can be made from the aforesaid hydrocarbon elastomers with the overdip compositions and treatment of the present invention. However the use of this invention is not confined to the manufacture of tires, and articles of the aforesaid hydrocarbon elastomers may be joined to each other prior to curing for any purpose.

This invention is further illustrated by the following examples which are not, however, intended to fully delineate the scope of this discovery.

In the examples the following materials and methods were employed.

Copolymer A was a copolymer containing 52 parts by weight of ethylene units, 44 parts by weight of propylene units and 3 parts by weight of unsaturated units derived from 1,4-hexadiene. The copolymer was prepared according to the general procedure of U.S. Patent 2,933,480 by copolymerizing ethylene, propylene and 1,4-hexadiene in the presence of a diisobutyl aluminum monochloride/vanadium oxytrichloride coordination catalyst. The copolymer exhibited a Mooney viscosity (ML–4/250° F.) of 70.

Copolymer B was the same as copolymer A, but had a Mooney viscosity (ML–4/250° F.) of 40.

Copolymer C was a copolymer containing 37.5 weight percent of norbornene, 3.1 weight percent of 1,4-hexadiene and the balance ethylene. The copolymer was prepared in a continuous reactor from the respective monomers using a coordination catalyst of vanadium tris (acetylacetonate) diisobutyl aluminum chloride, the aluminum/vanadium ratio being 29.4. The polymerization was conducted at 25° C. in tetrachloroethylene. A small amount of hydrogen was employed in the reaction vessel to control molecular weight. The resultant polymer had an inherent viscosity of 1.03 measured in tetrachloroethylene at 30° C.

Unsaturation measurements by bromine absorption were made using the following analytical procedure designed to correct for the effect of bromine substitution:

25 ml. of a solution of 5 ml. of bromine in 1 liter of carbon tetrachloride is added to a solution of the unknown in 50 ml. of carbon tetrachloride at 25° C. in an iodine number flask having a liquid seal head above the stopper. The flask is stoppered and a few ml. of 25% by weight aqueous potassium iodide solution is placed above the stopper in the liquid seal head, and the flask is stirred in the dark for 2 hours at 25° C. The flask is then opened, admitting the potassium iodide solution, and an additional quantity of about 25 ml. of 25% by weight aqueous potassium iodide is added. The resulting mixture is titrated to the starch end point with 0.1 N sodium thiosulfate solution. (If emulsification of the solvent obscures the end point the procedure is repeated with the addition of 75 ml. of 10% aqueous sodium chloride during the titration.) After titration, 5 ml. of aqueous potassium iodate solution containing 25 grams of potassium iodate per liter are added, and the mixture is again titrated with 0.1 N sodium thiosulfate to determine the amount of bromine taken up by substitution. A blank is also run by repeating the above procedure without the copolymer. The bromine adding to the carbon-carbon double bond is determined from the expression:

$$\text{Unsaturation (moles/kg.)} = \frac{0.1 \, [B - T - 2M + 2H]}{2 \times \text{grams of sample}}$$

where $B$ = ml. of 0.1 N sodium thiosulfate to end point before $KIO_3$ addition to the blank solution.

$T$ = ml. of 0.1 N sodium thiosulfate used to end point before $KIO_3$ addition, of the sample solution.

$M$ = ml. of 0.1 N sodium thiosulfate added to end point after $KIO_3$ solution is introduced into sample solution.

$H$ = ml. of 0.1 N sodium thiosulfate added to end point after $KIO_3$ solution is introduced into blank solution.

EXAMPLE 1

The following stocks were compounded on a 2-roll rubber mill at 200° F. In the case of copolymer C, the copolymer was preheated to 175° C. in an oven overnight to reduce gellation from shearing.

|  | Stock 1-1 | Stock 1-2 |
|---|---|---|
| Copolymer C | 100 | |
| Copolymer A | | 100 |
| HAF black | 90 | 80 |
| Naphthenic Petroleum Oil | 50 | 50 |
| Zinc Oxide | 5 | 5 |
| Stearic Acid | 1 | 1 |
| Tetramethyl thiuram monosulfide | 1.5 | 1.5 |
| 2-mercaptobenzothiazole | 0.75 | 0.75 |
| Sulfur | 1.0 | 1.0 |

A stock solution, 1-3, was made by mixing the following together.

| | Gm. |
|---|---|
| Stock 1-1 | 230 |
| Stock 1-2 | 345 |
| 1,1,1-trichloroethane | 2590 |

The mixing was conducted in a sealed jar agitated by rolling for 24 hours. A further quantity of 915 gm. of 1,1,1-trichloroethane was added and rolling continued for a further 24 hours. The mixture was then homogenized by blending for 4 minutes in a 1-gallon Waring Blendor at low speed. A further quantity of 950 grams of 1,1,-trichloroethane was added during the blending operation. The total amount of stock solution obtained was 4738 gm. having a Brookfield viscosity of 3040 cps at 25° C. and 13.2% by weight solids.

Two overdip cements were then made by blending batches of the above stock with two low molecular weight cyclic polymers of isoprene, having the following properties: isoprene polymer 1-4 had a melting point of 74-86° C., a number-average molecular weight of 1148 and unsaturation of 0.12 mole/kg. Isoprene polymer 1-5 was similar but had a melting point of 65-74° C., a number-average molecular weight of 1200 and an unsaturation of 0.44 mole/kg. 21.9 parts by weight of isoprene polymers 1-4 and 1-5 were each blended with 200 grams of the stock solution 1-3. The overdips thus obtained contained 200 parts of resin per 100 parts by weight of the combined ethylene/norbornene/1,4-hexadiene copolymer, copolymer C, and ethylene/propylene/1,4-hexadiene copolymer, copolymer A.

The tackifying properties of the overdips were tested as follows: A substrate elastomer was compounded having the following formulation in parts by weight.

| | |
|---|---|
| Copolymer A | 100 |
| HAF black | 80 |
| Naphthenic petroleum oil | 47.5 |
| Stearic acid | 1 |
| Zinc oxide | 5 |
| Sulfur | 1.5 |
| Tetramethyl thiuram monosulfide | 1.5 |
| 2-mercaptobenzothiazole | 0.75 |

The substrate elastomer was formed into 6 x 6 x 0.75" sheets and a cotton duck backing embedded in one surface in a laboratory compression molding press, using mild pressure at a temperature of 158° F. for 3 minutes. Strips were cut from the backed sheet and the elastomer surfaces were coated by painting with the above overdip and dried for two days. ¼" wide-test strips were then cut and pairs were joined by placing like overdip-treated surfaces together and rolling with an 8-lb. weight. Thirty seconds after joining the strips they were peeled apart in an Instron tensile testing machine at a draw rate of 5 inches/minute. The peel strength was recorded in pounds per linear inch.

| Cement | Number of Coats | Peel Strength p.l.i. |
|---|---|---|
| None | | 1.4 |
| Overdip with Resin 1-4 | 1 | 2.4 |
|  | 2 | 7.4 |
| Overdip with Resin 1-5 | 1 | 1.6 |
|  | 2 | 5.0 |

Fabrication of an automobile tire carcass 245 grams of stack 1-1 and 232 grams of a stack identical with 1-2 except in employed copolymer B instead of copolymer A were dispersed in 3730 grams of 1,1,1-trichloroethane solvent by rolling in a sealed jar for 5 days, then homogenized by blending for 5 minutes in a 1-gallon Waring Blendor. 2100 parts of the mixture was then mixed with 92.7 parts of the cyclic isoprene polymer 1-5 and rolled overnight to dissolve the resin.

Two plies were used to fabricate the tire carcass. Each was made with a nylon cord tire fabric which had been dipped in a tire cord adhesive consisting of a chlorosulfonated polyethylene latex/resorcinol formaldehyde resin adhesive formulation substantially as shown in Netherlands Patent 6,504,632 in Example 4 dried, then coated with compounded copolymer A by calendering. The plies were coated with the above overdip composition with a paint roller, dried for about 10 minutes in air at ambient temperature, then a second coating was applied and dried for 3 hours.

The plies were then used to make a tire carcass using a National Rubber Machine Company model 80 building drum. An inner liner consisting of a blend of 80 parts chlorinated butyl rubber and 20 parts of copolymer A compounded with carbon black and curing agents was laid down first. The plies were then laid down. The beads were set and the ply ends were then successfully turned up automatically.

EXAMPLE 2

Preparation of overdip mixture

An 8.95 weight percent solution of an ethylene/norbornene/1,4-hexadiene copolymer, copolymer C, in 1,1,1- trichloroethane was prepared. An overdip composition was then made having the following formulation:

| | Parts by weight |
|---|---|
| Copolymer solution | 66 |
| HAF-IOF carbon black [1] | 3.34 |
| Naphthenic petroleum oil | 2.61 |
| Cyclic isoprene polymer [2] | 5.9 |
| 1,1,1-trichloroethane | 83 |

[1] HAF black coated with 10 weight percent naphthenic petroleum processing oil.
[2] The cyclic isoprene polymer had a number-average molecular weight of 1170. Unsaturation 0.28 mole/kg. softening point 83–93° C.

Preparation of carcass stock

A carcass stock was prepared from the ethylene/propylene/1,4-hexadiene copolymer, copolymer A, using the following formulation:

| | Parts by weight |
|---|---|
| Copolymer A | 100 |
| HAF carbon black | 80 |
| Naphthenic petroleum oil | 47.5 |
| Stearic acid | 1 |
| Zinc oxide | 5 |
| Sulfur | 1.0 |
| 2-mercaptobenzothiazole | 0.75 |
| Tetramethylthiuram monosulfide | 1.5 |

The above stock was compounded on a rubber roll mill at 75–100° F.

Preparation of carcass fabric

The above carcass stock was calendered on both sides of nylon tire cords (which had been coated with tire cord adhesive of Example 1) to produce carcass fabric.

Measurement of tack

A method of measuring tack was employed which was designed to simulate the conditions encountered in automatic tire building equipment. Tack specimens were cut from the carcass fabric in 1" x ½" strips with the cords parallel to the 1" length. One piece is mounted vertically on the vertical face of a fixed metal block. The other piece is mounted horizontally across a similar block which can be driven into contact with the first block by an air cylinder. When the pieces are contacted, the contact area is 0.25 square inch. The force of contact is measured by the pressure applied to the air cylinder. The time of contact is determined by a timing mechanism which can be set for an interval of 0.8 to 15 seconds. The air cylinder is removed by air at 40 p.s.i. providing a break time of about 40 milliseconds. The tack is determined as the instantaneous breaking force measured by a load cell transducer, and a high speed recorder. The contact time, the contact pressure and the breaking force are recorded.

Tack samples of the ethylene/propylene/1,4-hexadiene carcass fabric were coated with the overdip mixture above and dried for four hours before testing, then tested as above. The following results were obtained.

| Contact Time, Seconds | Contact Force, p.s.i. | Breaking Force, p.s.i. | After Repetitions |
|---|---|---|---|
| 1 | 40 | 37.6 | 3 |
| 1 | 40 | 39.2 | 30 |
| 4 | 40 | 54 | 3 |
| 1 | 80 | 47.2 | 3 |
| 1 | 80 | 57.6 | 30 |
| 4 | 80 | 80.0 | 3 |

Manufacture of tire carcasses on automatic equipment

Two plies were made up of nylon tire fabric and compounded ethylene/propylene/1,4-hexadiene copolymer substantially as described in Example 1.

Tire carcasses were fabricated using the machinery and procedure of Example 1. Approximately ½ gallon of the overdip compositions were employed for two completed carcasses, the surfaces of the plies being given two coats of the overdip composition with a paint roller each of which was dried in air at ambient temperature. The beads were set and the ends of the plies were turned up automatically successfully in 10–15 seconds at a drum rotation speed of 220 r.p.m.

A tread made of the following tread stock:

| | Parts by weight |
|---|---|
| Copolymer A | 100 |
| ISAF black | 80 |
| Naphthenic petroleum oil | 50 |
| Zinc oxide | 5 |
| Stearic acid | 1 |
| Tetramethylthiuram monosulfide | 1.5 |
| 2-mercaptobenzothiazole | 0.75 |
| Sulfur | 1.5 | which had been coated on its inner surface with the overdip solution was then applied, the composite article was removed from the building drum and cured into a passenger tire in a standard bag-o-matic press.

As many widely differing embodiments of this invention can be made without departing from the spirit and scope thereof, it is to be understood that this invention is not limited to the specific embodiments thereof except as defined in the appended claims.

We claim:
1. An overdip solution for adhering particles of saturated-chain sulfur-curable elastomeric copolymers of α-olefins to each other comprising:
   I. A linear, statistical sulfur-curable chain-saturated elastomer copolymer of
      (a) from 30 to 45 weight percent of units having the formula:

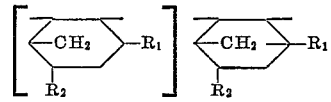

said units being derived from a norbornene having the formula:

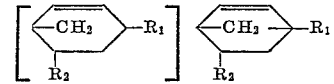

wherein $R_1$ and $R_2$ are hydrogen or alkyl groups having from 1 to 4 carbon atoms;
      (b) from 2 to 15% by weight of unsaturated units derived from a non-conjugated aliphatic diene having at least one double bond polymerizable with an anionic catalyst; and
      (c) the balance of said copolymer being units derived from a straight chain α-olefin having from 2 to 4 carbon atoms and optionally minor amounts of other α-olefins having from 5 to 18 carbon atoms said copolymers having an inherent viscosity measured on an 0.1% by weight solution in tetrachloroethylene at 30° C. of from 0.5 to 2.0;
   II. A low molecular weight cyclic polymer of isoprene having an unsaturation of about 0.1 to 1.5 moles/kg. as measured by bromine addition, in an amount of from 0.1 to 5 parts per part by weight of said copolymer;
   III. About 0.5 to 1.5 parts of carbon black per part of said copolymer; the ingredients I to III inclusive being dissolved or dispersed to form a mixture containing from about 5 to 50% by weight of total solids in
   IV. A solvent selected from the group consisting of weak and non-hydrogen bonding solvents having a solubility parameter between about 7.3 and about 9.5.
2. Composition of claim 1 in which said polymer of isoprene is present in amount between 0.75 and 5 parts per part of said copolymer.

3. Composition of claim 1 in which the α-olefin component of said copolymer is ethylene.

4. Composition of claim 1 in which the said copolymer is an ethylene/norbornene/1,4-hexadiene copolymer.

5. Composition of claim 2 in which the said copolymer is an ethylene/norbornene/1,4-hexadiene copolymer.

6. Composition of claim 5 in which the said isoprene polymer has a number average molecular weight between 700 and 3000.

7. Composition of claim 6 in which the said carbon black is a furnace black.

8. Composition of claim 7 in which the said solvent is 1,1,1-trichloroethane.

References Cited

UNITED STATES PATENTS

| 2,555,068 | 5/1951 | Van Veersen | 260—94.7 |
| 3,093,621 | 6/1963 | Gladding | 260—80.78 |
| 3,227,781 | 1/1966 | Klug et al. | 260—33.8 |

FOREIGN PATENTS

| 483,815 | 6/1952 | Canada. |

MORRIS LIEBMAN, *Primary Examiner.*

S. L. FOX, *Assistant Examiner.*